(12) United States Patent
Chen et al.

(10) Patent No.: US 11,881,321 B2
(45) Date of Patent: Jan. 23, 2024

(54) DEVICE FOR MEASURING TOTAL GAS CONTENT OF PRIMARY CIRCUIT OF PWR NUCLEAR POWER

(71) Applicant: SANMEN NUCLEAR POWER CO., LTD., Taizhou (CN)

(72) Inventors: Dong Chen, Taizhou (CN); Tao Hou, Taizhou (CN); Li Miao, Taizhou (CN); Xudong Wu, Taizhou (CN); Gaoyong Liu, Taizhou (CN)

(73) Assignee: SANMEN NUCLEAR POWER CO., LTD., Taizhou (CN)

( * ) Notice: Subject to any disclaimer, the term of this patent is extended or adjusted under 35 U.S.C. 154(b) by 387 days.

(21) Appl. No.: 17/433,023

(22) PCT Filed: Aug. 5, 2021

(86) PCT No.: PCT/CN2021/110864
§ 371 (c)(1),
(2) Date: Aug. 23, 2021

(87) PCT Pub. No.: WO2022/062710
PCT Pub. Date: Mar. 31, 2022

(65) Prior Publication Data
US 2022/0277863 A1 Sep. 1, 2022

(30) Foreign Application Priority Data
Sep. 28, 2020 (CN) .......................... 202011037357.9

(51) Int. Cl.
*G01N 1/10* (2006.01)
*G01N 7/14* (2006.01)
*G21C 17/022* (2006.01)

(52) U.S. Cl.
CPC ............. *G21C 17/022* (2013.01); *G01N 1/10* (2013.01); *G01N 2001/105* (2013.01)

(58) Field of Classification Search
CPC .. G21C 17/022; G01N 1/10; G01N 2001/105; G01N 2001/1037; G01N 7/14; G01N 2001/1031
See application file for complete search history.

(56) References Cited

U.S. PATENT DOCUMENTS 4,745,795 A * 5/1988 Emmert ............... G21C 17/022
  376/256
9,810,708 B2 * 11/2017 Elkin ........................ G01N 1/10

FOREIGN PATENT DOCUMENTS

CN    206740462 U  * 12/2017 ............... G01N 1/22
KR   20160114298 A  * 10/2016 ............... G01N 1/10

* cited by examiner

*Primary Examiner* — Herbert K Roberts
*Assistant Examiner* — Anthony W Megna Fuentes
(74) *Attorney, Agent, or Firm* — LOZA & LOZA, LLP; Michael F. Fedrick

(57) ABSTRACT

A device for measuring a total gas content of a primary circuit of a PWR nuclear power plant includes a shielding protective cover, and a sampling assembly and a sample measuring assembly that are detachably connected to the shielding protective cover; the sampling assembly includes a sampling bottle; a valve connected to one mouth of the sampling bottle through a pipeline; a second valve connected to the other mouth of the sampling bottle through a pipeline; a first quick female connector connected with the first valve through a pipeline; a second quick female connector connected to the second valve through a pipeline; a balance pipeline, one end being connected to the pipeline between the first valve and the first quick female connector, and the other end being connected to the pipeline between the second valve and the second quick female connector.

10 Claims, 4 Drawing Sheets

DEVICE FOR MEASURING TOTAL GAS CONTENT OF PRIMARY CIRCUIT OF PWR NUCLEAR POWER

CROSS REFERENCE TO RELATED APPLICATIONS

This application is a national phase application of PCT International Patent Application No. PCT/CN2021/110864, filed Aug. 5, 2021, which claims priority to Chinese Patent Application No. 202011037357.9, filed Sep. 28, 2021, 2020; the contents of which are incorporated herein by reference in their entireties.

TECHNICAL FIELD

The present disclosure relates to the technical field of nuclear safety and nuclear system detection, and in particular, to a device for measuring a total gas content of a primary circuit of a PWR (pressurized water reactor) nuclear power plant.

BACKGROUND

Nuclear power is one of the three pillars of power in the world today. At present, there are more than 400 nuclear power units in operation in more than 30 countries and regions in the world, with a total capacity of more than 300 million kilowatts. There are many types of nuclear power units, such as AP1000, CPR1000, and CNP1000, ACP1000, CAP1000, etc. Among them, the pressurized water reactor nuclear power plant uses the primary circuit main pump to transport the reactor coolant, so that it completes the circulation among the core, coolant loop, and steam generator, so as to realize the thermal transmission on the primary side, and also has the function of ensuring the safety of the core, it is one of the most important main equipment of a nuclear power plant.

When the gas content of the coolant in the primary circuit is too high, the gas will precipitate at the suction port of the main pump and adhere to the bearing surface, affecting the lubrication and cooling of the bearing to cause damage to the pump. At the same time, the impeller of the main pump may subject to damage under the influence of cavitation. At present, there are no relevant standards and analytical methods to determine the total gas content of the primary circuit of a PWR nuclear power plant. In order to confirm the degassing effect of the coolant in the primary circuit and ensure the safe and stable operation of the main pump, it is necessary to design a device that can measure the total gas content of the coolant in the primary circuit of the reactor.

SUMMARY

Aiming at the problems existing in the prior art, the present disclosure proposes a device for measuring the total gas content of the primary circuit of a PWR nuclear power plant, such that the gas content in the primary circuit can be quickly sampled and accurately measured, it is safe and reliable, convenient to maintain, and easy to carry.

A device for measuring a total gas content of a primary circuit of a PWR nuclear power plant, comprising a shielding protective cover, and a sampling assembly and a sample measuring assembly that are detachably connected to the shielding protective cover;
the sampling assembly comprises
a sampling bottle;
a first valve connected to a mouth of the sampling bottle through a first pipeline;
a second valve connected to an other mouth of the sampling bottle through a second pipeline;
a first quick female connector connected to the first valve through a third pipeline;
a second quick female connector connected to the second valve through a fourth pipeline;
a balance pipeline, one end being connected with the third pipeline between the first valve and the first quick female connector, and an other end being connected with the fourth pipeline between the second valve and the second quick female connector;
the sample measuring assembly comprises
a three-way valve;
a stop valve connected to a first valve port of the three-way valve through a fifth pipeline;
a volume measuring tube connected to the stop valve through a first hose;
a first quick male connector connected to a second valve port of the three-way valve through a second hose;
a second quick male connector connected to a third valve port of the three-way valve through a third hose;
a peristaltic pump detachably connected with the second hose located between the first quick male connector and the three-way valve.

In a preferred embodiment, the sample measuring assembly further comprises
a titration stand connected with the shielding protective cover and used for installing the volume measuring tube.

In a preferred embodiment, the titration stand comprises
a support rod vertically penetrating a top of the shielding protective cover, and a part of the support rod located inside the shielding protective cover being fixedly connected to the shielding protective cover;
a butterfly clip connected with an other part of the support rod located outside the shielding protective cover and detachably connected with the volume measuring tube.

In a preferred embodiment, the top of the shielding protective cover is provided with a volume measuring tube perforation that allows the volume measuring tube to penetrate.

In a preferred embodiment, the shielding protective cover comprises a cover door, and the cover door is provided with
a first opening allowing an adjusting knob of the first valve to pass out of the shielding protective cover;
a second opening allowing an adjusting knob of the second valve to pass out of the shielding protective cover;
a third opening allowing an adjusting knob of the stop valve to pass out of the shielding protective cover.

In a preferred embodiment, a side wall of the shielding protective cover is provided with
a hose perforation allowing a part of the second hose between the first quick male connector and the three-way valve to pass out of the shielding protective cover.

In a preferred embodiment, the shielding protective cover is provided with a limit installation rack for detachable connection with the sampling assembly and the sample measuring assembly.

In a preferred embodiment, the top of the shielding protective cover is provided with a handle.

In a preferred embodiment, the first valve and the second valve are all needle valves.

In a preferred embodiment, each of the first to the fifth pipelines adopts a bite-type pipeline.

The device for measuring the total gas content of the primary circuit of the PWR nuclear power plant of the present disclosure is convenient to disassemble and assemble, easy to carry, quick sampling, accurate measurement of the total gas content of the primary circuit, and can be effectively used to detect the gas content of the coolant in the primary circuit, such that the safe and efficient operation of the main pump can be insured. At the same time, the setting of the shielding protective cover can reduce the radiation dose of the coolant to the inspectors and ensure the life safety of the inspectors.

DESCRIPTION OF EMBODIMENTS

Figure 1:
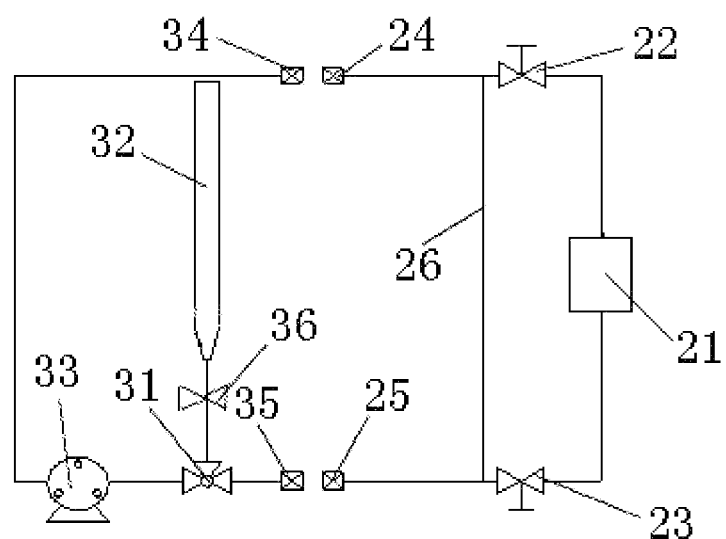
FIG. 1 is a schematic diagram showing a structure of a sampling assembly and a sample measuring assembly according to the present disclosure.
Figure 2:
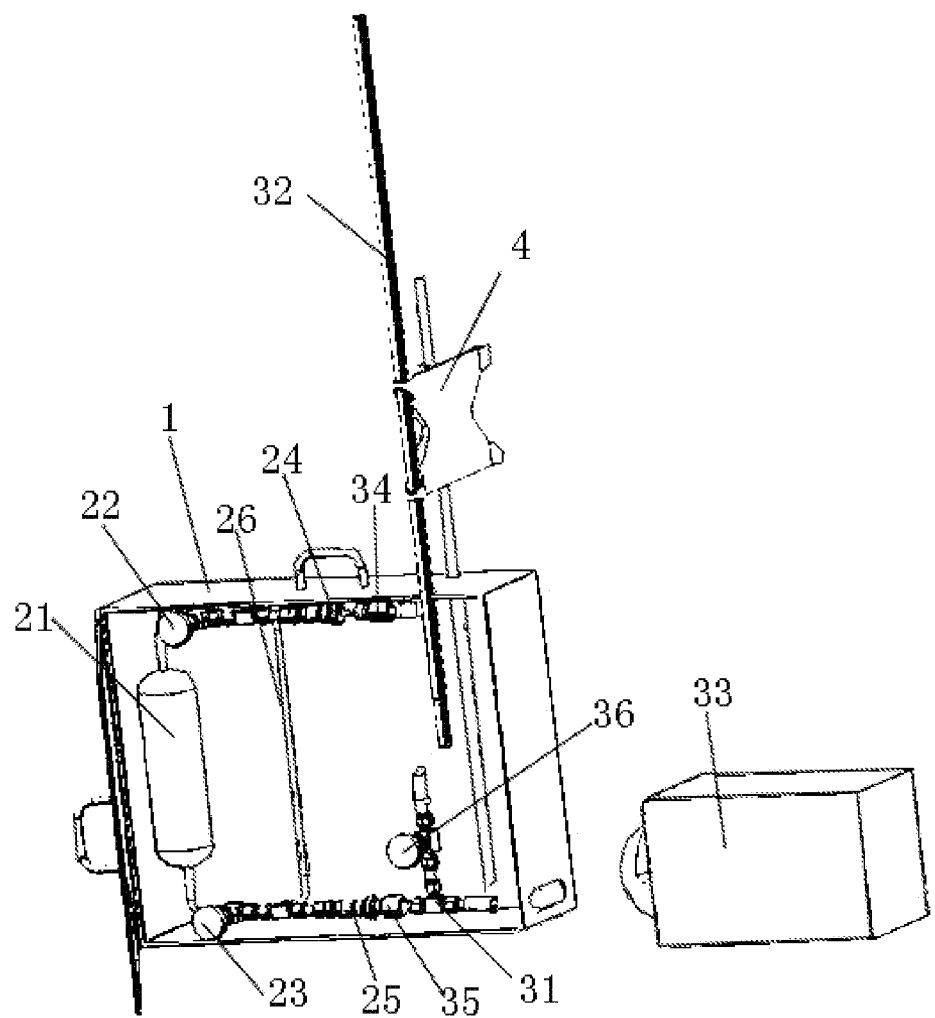
FIG. 2 is a schematic diagram showing a structure of a device for measuring the total gas content of the primary circuit of the PWR nuclear power plant according to the present disclosure.
Figure 3:
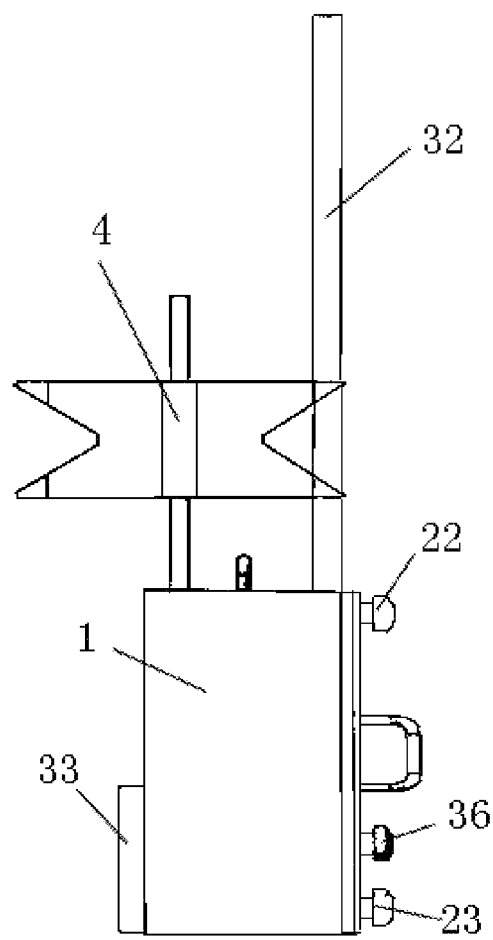
FIG. 3 is a side view of the measuring device in FIG. 2.
Figure 4:
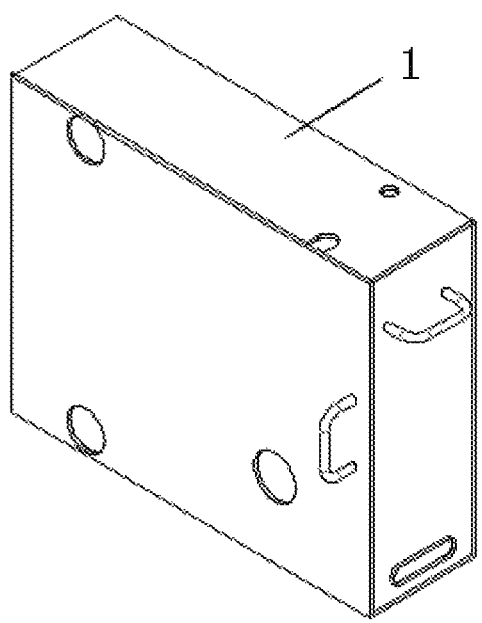
FIG. 4 is a schematic diagram showing a structure of the shielding protective cover according to the present disclosure.

As shown in FIGS. 1 to 4, a device for measuring the total gas content of the primary circuit of a PWR nuclear power plant may include a shielding protective cover 1, and a sampling assembly and a sample measuring assembly that are detachably connected to the shielding protective cover 1. The shielding protective cover 1 may be provided with a limit installation rack detachably connected to the sampling assembly and the sample measuring assembly. The sampling assembly and the sample measuring assembly can be quickly connected or disassembled to the shielding protective cover 1 through the limit installation rack, such that the ease of use of the device of the present disclosure can be improved. The shielding protective cover 1 may be provided with a handle at the top, and the arrangement of the handle is convenient for the staff to carry the device for measuring the total gas content of the primary circuit of the PWR nuclear power circuit of the present disclosure. In addition, the coolant has radiation, and the radiation dose of the measurement personnel during the measurement process can be reduced by shielding the protective cover 1.

The sampling assembly may include a sampling bottle 21, a valve 22 connected to one mouth of the sampling bottle 21 through a $1^{st}$ pipeline; a second valve 23 connected to the other mouth of the sampling bottle 21 through a $2^{nd}$ pipeline; a first quick female connector 24 connected to the first valve 22 through a $3^{rd}$ pipeline; a second quick female connector 25 connected to the second valve 23 through a $4^{th}$ pipeline, one end may be connected to the $3^{rd}$ pipeline located between the first valve 22 and the first quick female connector 24, the other end may be connected to the balance pipeline 26 connected to the $4^{th}$ pipeline located between the second valve 23 and the second quick female connector 25.

The specific usage method of the sampling assembly may be as follows:

taking the sampling assembly out of the shielding protective cover 1, then opening the second valve 23 and first valve 22 in the sampling assembly, and then closing the two valves on the sampling interface in the primary circuit;

connecting the second quick female connector 25 and the first quick female connector 24 of the sampling assembly to the two sampling interfaces of the primary circuit in turn;

opening the two valves in the primary circuit sampling interface and waiting for about 1 minute;

closing the two valves on the sampling interfaces of the primary circuit after the sampling is completed, and then closing second valve 23 and first valve 22 in the sampling assembly in turn;

disconnecting the second quick female connector 25 and the first quick female connector 24 of the sampling assembly from the sampling interfaces of the primary circuit. At this moment, the sampling steps are completed.

Among them, the nominal volume of the sampling bottle 21 may be 150 ml, and the volume can also be appropriately increased. The material used may be stainless steel to meet the requirements of explosion-proof, corrosion-resistant and strength. Both the first valve 22 and the second valve 23 may adopt needle valves, such that it is convenient for adjusting the flow rate. The second quick female connector 25 and the first quick female connector 24 may be not only matched with the second quick male connector 35 and the first quick male connector 34, but also matched with the sampling interfaces, such that it is convenient for quick sampling. At the same time, the quick connectors have double-ended shutoff function to prevent sample leakage. Each of the elements (the $1^{st}$ to the $5^{th}$ pipelines) in the sampling assembly may be connected by a ferrule pipeline or a bite-type pipeline, such that it is convenient for sealing and easy for maintenance and replacement.

In addition, the setting function of the balance pipeline 26 is to prevent air leakage and achieve a self-balancing effect. If the balance pipeline 26 is not provided, it is necessary to open the first valve 22 and the second valve 23 when connecting the second quick male connector 35 to the second quick female connector 25, and connecting the first quick male connector 34 to the first quick female connector 24. Otherwise, due to the high pressure of the sample, the second quick male connector 35 and the second quick female connector 25, the first quick male connector 34 and the first quick female connector 24 cannot be connected. If the connectors are connected when the first valve 22 and the second valve 23 are open, the gas in the sampling bottle 21 will leak, and the measurement result of the total gas content of the primary circuit of the pressurized water reactor nuclear power plant will be inaccurate.

The sample measuring assembly may include a three-way valve 31; a stop valve 36 connected to a first valve port of the three-way valve 31 through a $5^{th}$ pipeline; a volume measuring tube 32 connected to the stop valve 36 through a $1^{st}$ hose; a first quick male connector 34 connected to a second valve port of the three-way valve 31 through a $2^{nd}$ hose; a second quick male connector 35 connected to a third valve port of the three-way valve 31 through a $3^{rd}$ hose; and a peristaltic pump 33 detachably connected with the $2^{nd}$ hose between the quick male connector 34 and the three-way valve 31.

The specific measurement method of the gas content in the sample may include:

Step 1), using a beaker to inject water from the upper part of the volume measuring tube 32 of the sample measuring assembly until the first quick male connector 34 and the second quick male connector 35 both have water flow out when they are toggled (when the first quick male connector 34 and the second quick male connector 35 are toggled, a water receiver can be placed under the first quick male connector 34 and the second quick male connector 35, to prevent water flow from wetting the shielding protective cover 1); stopping injecting the water and closing the stop valve 36. After the water injecting is completed, the sample measuring assembly is a water entity. At this time, the peristaltic pump 33 is not clamped with the hose;

Step 2), connecting the second quick male connector 35 to the second quick female connector 25, and connecting the first quick male connector 34 to the first quick female connector 24. During the connection process, the second valve 23 and the first valve 22 are both in a closed state;

Step 3), using a beaker to inject water from the upper part of the volume measuring tube 32, and opening the stop valve 36 slowly to reach the liquid level of the volume measuring tube to a reading of 20 mL;

Step 4), opening the second valve 23 slowly, and closing the stop valve 36 when the liquid level of the volume measuring tube 32 is stable;

Step 5), clamping the hose on the peristaltic pump 33, opening the first valve 22, turning on the power of the peristaltic pump 33, adjusting the peristaltic pump 33 to gear 1 and keeping it closed for 30 seconds, removing the hose from the peristaltic pump 33, and closing the first valve 22, opening the stop valve 36 slowly, then closing the stop valve 36, and recording the rising liquid level of the volume measuring tube 32;

Step 6), repeating Step 5); opening the stop valve 36 slowly when the first valve 22 is closed; closing the second valve 23 when the liquid level of the volume measuring tube 32 no longer changes or there is a slight drop; closing the stop valve 36, and recording the rising liquid level value A of the volume measuring tube. The gas content in the sample can be calculated through the level value A and other measurement data.

Among them, the peristaltic pump 33 is to circulate the entire sampling loop to ensure that the gas in the sample in the sampling bottle is fully released, and the peristaltic pump 33 has a clamp that is clamped with the hose body. The volume measuring tube 32 has a measuring range not less than 50 ml and is used to measure the gas volume in the sample. The top of the shielding protective cover 1 may be provided with a volume measuring tube perforation that allows the volume measuring tube 32 to pass through. The sample measuring assembly may further include a titration stand 4 connected to the shielding protective cover 1 for installing the volume measuring tube 32. The titration stand 4 may include a support rod vertically penetrating the top of the shielding protective cover 1, one part of the support rod located inside the shielding protective cover 1 may be fixedly connected to the shielding protective cover 1; and a butterfly clip connected to the other part of the support rod located inside the shielding protective cover 1, and detachably connected to the volume measuring tube 32.

The shielding protective cover 1 may include a cover door. The cover door may be provided with a first opening that allows the adjusting knob of the first valve 22 to pass out of the shielding protective cover 1; a second opening that allows the adjusting knob of the second valve 23 to pass out of the shielding protective cover 1; and a third opening that allows the adjusting knob of the stop valve 36 to pass out of the shielding protective cover 1. The side wall of the shielding protective cover 1 may be provided with a hose perforation that allows the hose between the first quick male connector 34 and the three-way valve 31 to pass out of the shielding protective cover 1.

The device for measuring the total gas content of the primary circuit of the PWR nuclear power plant according to the present disclosure is convenient to disassemble and assemble, easy to carry, quick sampling, accurate measurement of the total gas content of the primary circuit, and can be effectively used to detect the gas content of the coolant in the primary circuit, so as to ensure the safe and efficient operation of the main pump. At the same time, the setting of the shielding cover can reduce the radiation dose of the coolant to the inspectors and ensure the life safety of the inspectors.

The above-mentioned embodiments only describe the preferred embodiments of the present disclosure, and do not limit the concept and scope of the present disclosure. Without departing from the design concept of the present disclosure, various modifications and improvements made by those skilled in the art to the technical solution of the present disclosure shall fall within the protection scope of the present disclosure. The technical content claimed by the present disclosure has been all defined in the claims.

What is claimed is:

1. A device for measuring a total gas content of a primary circuit of a PWR nuclear power plant, wherein comprising a shielding protective cover, and a sampling assembly and a sample measuring assembly that are detachably connected to the shielding protective cover;
    the sampling assembly comprising
        a sampling bottle;
        a first valve connected to a mouth of the sampling bottle through a first pipeline;
        a second valve connected to an other mouth of the sampling bottle through a second pipeline;
        a first quick female connector connected to the first valve through a third pipeline;
        a second quick female connector connected to the second valve through a fourth pipeline;
        a balance pipeline, one end being connected with the third pipeline between the first valve and the first quick female connector, and an other end being connected with the fourth pipeline between the second valve and the second quick female connector;
    the sample measuring assembly comprising
        a three-way valve;
        a stop valve connected to a first valve port of the three-way valve through a fifth pipeline;
        a volume measuring tube connected to the stop valve through a first hose;
        a first quick male connector connected to a second valve port of the three-way valve through a second hose;
        a second quick male connector connected to a third valve port of the three-way valve through a third hose;
        a peristaltic pump detachably connected with the second hose located between the first quick male connector and the three-way valve.

2. The device for measuring a total gas content of a primary circuit of a PWR nuclear power plant according to claim 1, wherein: the sample measuring assembly further comprises
    a titration stand connected with the shielding protective cover and used for installing the volume measuring tube.

3. The device for measuring a total gas content of a primary circuit of a PWR nuclear power plant according to claim 2, wherein: the titration stand comprises
    a support rod vertically penetrating a top of the shielding protective cover, and a part of the support rod located inside the shielding protective cover being fixedly connected to the shielding protective cover;
    a butterfly clip connected with an other part of the support rod located outside the shielding protective cover and detachably connected with the volume measuring tube.

4. The device for measuring a total gas content of a primary circuit of a PWR nuclear power plant according to claim 3, wherein: the top of the shielding protective cover is provided with a volume measuring tube perforation that allows the volume measuring tube to penetrate.

5. The device for measuring a total gas content of a primary circuit of a PWR nuclear power plant according to claim 1, wherein: the shielding protective cover comprises a cover door, and the cover door is provided with
- a first opening allowing an adjusting knob of the first valve to pass out of the shielding protective cover;
- a second opening allowing an adjusting knob of the second valve to pass out of the shielding protective cover;
- a third opening allowing an adjusting knob of the stop valve to pass out of the shielding protective cover.

6. The device for measuring a total gas content of a primary circuit of a PWR nuclear power plant according to claim 1, wherein: a side wall of the shielding protective cover is provided with
- a hose perforation allowing a part of the second hose between the first quick male connector and the three-way valve to pass out of the shielding protective cover.

7. The device for measuring a total gas content of a primary circuit of a PWR nuclear power plant according to claim 1, wherein: the shielding protective cover is provided with a limit installation rack for detachable connection with the sampling assembly and the sample measuring assembly.

8. The device for measuring a total gas content of a primary circuit of a PWR nuclear power plant according to claim 1, wherein the top of the shielding protective cover is provided with a handle.

9. The device for measuring a total gas content of a primary circuit of a PWR nuclear power plant according to claim 1, wherein the first valve and the second valve are all needle valves.

10. The device for measuring a total gas content of a primary circuit of a PWR nuclear power plant according to claim 1, wherein each of the first to the fifth pipelines adopts a bite-type pipeline.

* * * * *